US011961498B2

(12) United States Patent
Yanagawa

(10) Patent No.: US 11,961,498 B2
(45) Date of Patent: Apr. 16, 2024

(54) MUSICAL INSTRUMENT, NON-TRANSITORY COMPUTER READABLE MEDIUM AND MUSICAL INSTRUMENT COMMUNICATION SYSTEM

(71) Applicant: YAMAHA CORPORATION, Hamamatsu (JP)

(72) Inventor: Takahiro Yanagawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 566 days.

(21) Appl. No.: 17/200,199

(22) Filed: Mar. 12, 2021

(65) Prior Publication Data

US 2021/0295805 A1 Sep. 23, 2021

(30) Foreign Application Priority Data

Mar. 23, 2020 (JP) ................................ 2020-051492

(51) Int. Cl.
*G10H 1/00* (2006.01)

(52) U.S. Cl.
CPC ..... *G10H 1/0008* (2013.01); *G10H 2220/221* (2013.01); *G10H 2240/095* (2013.01); *G10H 2240/171* (2013.01)

(58) Field of Classification Search
CPC ........... G10H 1/0008; G10H 2220/221; G10H 2240/095; G10H 2240/171
USPC ................................................................ 84/3
See application file for complete search history.

(56) References Cited

U.S. PATENT DOCUMENTS 4,614,145 A * 9/1986 Chibana ................... G10H 1/24 984/340
6,438,611 B1 * 8/2002 Hara .................... G10H 1/0058 709/248
8,180,073 B1 * 5/2012 Grote ..................... G10H 7/004 84/660
10,642,409 B2 * 5/2020 Obata ...................... G10H 1/34
2005/0204902 A1 * 9/2005 Shibukawa .......... G10H 1/0058 84/645

(Continued)

FOREIGN PATENT DOCUMENTS

CN 103810990 A 5/2014
CN 110111761 A * 8/2019 ........... G10H 1/0008

(Continued)

OTHER PUBLICATIONS

"Smart Pianist Manual." Yamaha Corporation. Apr. 2018. English translation provided.

(Continued)

*Primary Examiner* — Christina M Schreiber
(74) *Attorney, Agent, or Firm* — ROSSI, KIMMS & McDOWELL LLP

(57) ABSTRACT

An electronic keyboard musical instrument includes a keyboard that receives a musical performance operation. The electronic keyboard musical instrument further includes a plurality of operation units that receive an operation except for the musical performance operation with respect to the electronic keyboard musical instrument, and a disabler that disables operational input in at least one operation unit among the plurality of operation units when a connection with a tablet for inputting an operation with respect to the electronic keyboard musical instrument is established.

7 Claims, 8 Drawing Sheets

(56) References Cited

U.S. PATENT DOCUMENTS

| | | | | |
|---|---|---|---|---|
| 2006/0015815 | A1* | 1/2006 | Okamoto | G10H 1/0008 715/736 |
| 2009/0091543 | A1* | 4/2009 | Camp, Jr. | G10H 1/0008 345/173 |
| 2018/0275816 | A1* | 9/2018 | Obata | G06F 3/0488 |
| 2021/0295805 | A1* | 9/2021 | Yanagawa | G10H 1/0008 |

FOREIGN PATENT DOCUMENTS

| | | | | | |
|---|---|---|---|---|---|
| CN | 113412507 | A | * | 9/2021 | G09B 15/023 |
| JP | 2005004082 | A | | 1/2005 | |
| JP | 4530001 | B2 | * | 8/2010 | |
| JP | 2013190690 | A | * | 9/2013 | G10H 1/0008 |
| JP | 2013195466 | A | * | 9/2013 | G10H 1/0008 |
| JP | 2013195645 | A | * | 9/2013 | G10H 1/0008 |
| JP | 2014526057 | A | * | 10/2014 | |
| JP | 6350238 | B2 | | 7/2018 | |
| JP | 6350238 | B2 | * | 7/2018 | |
| JP | 2018159769 | A | * | 10/2018 | |
| KR | 20140012425 | A | * | 2/2014 | |

OTHER PUBLICATIONS

"Clavinova Owner's Manual CSP-170 CSP-150." Yamaha Corporation. Jul. 2017. English translation provided.

Office Action issued in Chinese Appln. No. 202110256199.4 dated Sep. 20, 2023. English translation provided.

Office Action issued in Japanese Appln. No. 2020-051492, dated Dec. 26, 2023. English translation provided.

Office Action issued in Chinese Appln. No. 202110256199.4, mailed Mar. 1, 2024. English machine translation provided.

* cited by examiner

MUSICAL INSTRUMENT, NON-TRANSITORY COMPUTER READABLE MEDIUM AND MUSICAL INSTRUMENT COMMUNICATION SYSTEM

BACKGROUND

Technical Field

The present disclosure relates to a musical instrument, a non-transitory computer readable medium storing a program linked with the musical instrument and musical instrument communication system.

Description of Related Art

A musical instrument such as an electronic keyboard musical instrument includes an operation unit for performing an operation of making various settings. In case of an electronic keyboard musical instrument, an operation unit is arranged at a side portion of a keyboard or an inner position in the keyboard, for example. A player can make settings of a volume, a musical performance style and an accompaniment sound and so on by operating the operation unit.

Further, there is a musical instrument such as an electrical keyboard musical instrument including an interface for communicating with an electronic terminal such as a tablet. For example, the electronic terminal is connected to the electronic keyboard musical instrument, whereby a player can perform an operation of making various settings with respect to the electronic keyboard musical instrument by operating the electronic terminal. JP 6350238 A discloses an information processing apparatus connected to an electronic musical instrument.

SUMMARY

As described above, there are a method of performing an operation of making various settings with respect to a musical instrument by using an operation unit provided in a main body of the musical instrument and a method of performing an operation of making various settings with respect to the musical instrument by using an electronic terminal connected to the musical instrument. In a situation where there are a plurality of such operation methods, it is expected that an interface having good operability for a player is expected.

An object of the present disclosure is to provide an interface having good operability for a player in a musical instrument in a case where there are a plurality of methods to operate the musical instrument.

A musical instrument according to one aspect of the present disclosure includes a musical performance operation unit that receives a musical performance operation, and includes a plurality of operation units that receive an operation except for the musical performance operation with respect to the musical instrument, and a disabler that disables operational input in at least one operation unit among the plurality of operation units when a connection with an electronic terminal for inputting an operation with respect to the musical instrument is established.

A non-transitory computer readable medium storing a musical instrument linkage program according to another aspect of the present disclosure is installed in a computer that communicates with a musical instrument, and causes the computer to confirm presence or absence of a connection with the musical instrument, and disable reception of operational input in at least one operation unit among a plurality of operation units, which receive an operation with respect to the musical instrument, included in the musical instrument when a connection with the musical instrument is established.

Other features, elements, characteristics, and advantages of the present disclosure will become more apparent from the following description of preferred embodiments of the present disclosure with reference to the attached drawings.

The present disclosure enables provision of an interface having good operability for a player in a musical instrument in a case where there are a plurality of methods to operate the musical instrument.

DETAILED DESCRIPTION

(1) Appearance Configuration of Electronic Keyboard Musical Instrument

Figure 1:
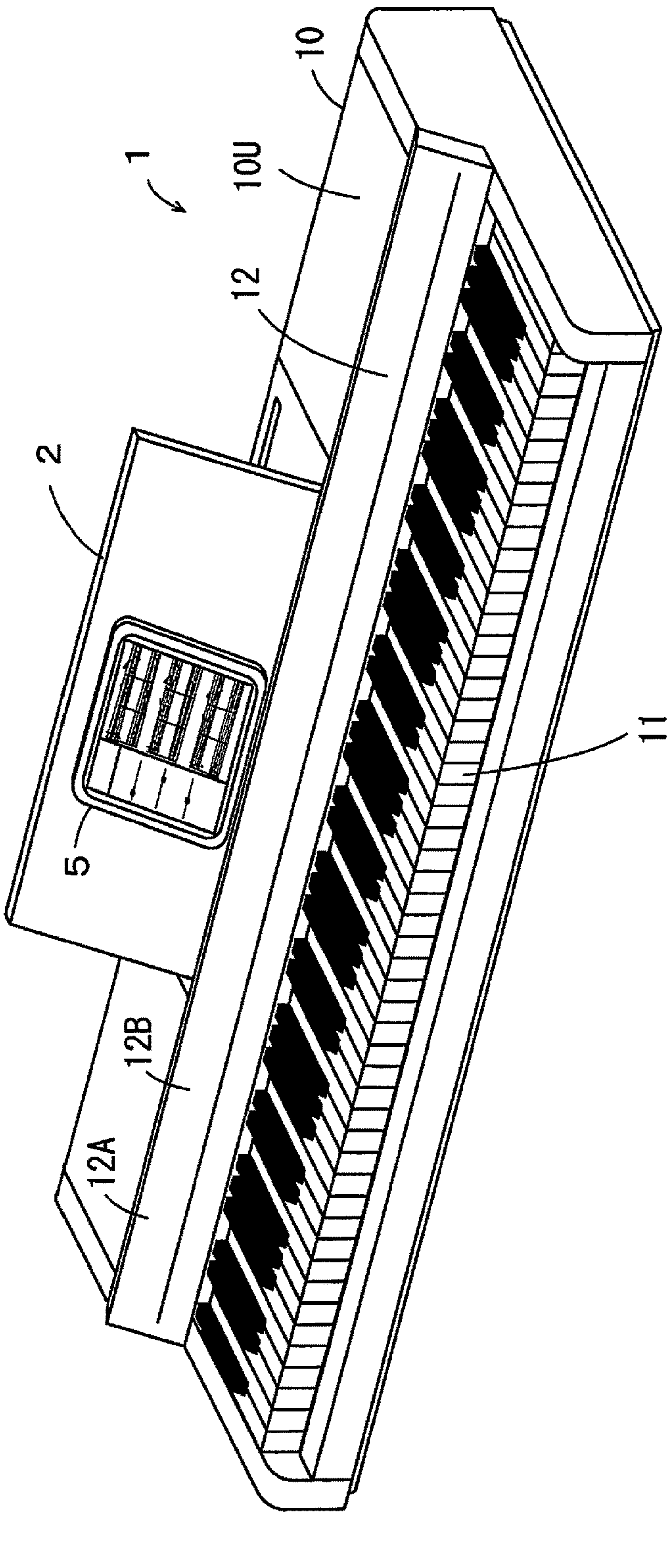
FIG. 1 is a diagram showing the appearance of an electronic keyboard musical instrument and a tablet according to an embodiment.

FIG. 1 is a diagram showing the appearance of an electronic keyboard musical instrument 1 and a tablet 5 according to a present embodiment. The external shape of the electronic keyboard musical instrument 1 is formed by a casing 10. A keyboard 11 is arranged in a front portion of the casing 10. A panel 12 is arranged at a position farther rearward than the keyboard 11. A display 12A and a plurality of operation units 12B are arranged in the panel 12. In the present embodiment, the panel 12 has a horizontally elongated shape extending in a left-and-right direction. The display 12A and the plurality of operation units 12B are arranged in this horizontally elongated panel 12. A player can perform an operation of making various settings such as settings of a volume, a musical performance style and an accompaniment sound with respect to the electronic keyboard musical instrument 1 by operating the plurality of operation units 12B. Further, the player can confirm information about various settings such as the current settings of a volume, a musical performance style and an accompaniment sound by making reference to the display 12A.

A music stand 2 is provided on an upper surface 10U of the casing 10 at the substantially center position in the left-and-right direction. A tablet 5 is placed on the music stand 2. The tablet 5 can be connected to the electronic keyboard musical instrument 1 by communication. The player can perform an operation of making various settings such as settings of a volume, a musical performance style and an accompaniment sound with respect to the electronic keyboard musical instrument 1 by operating the tablet 5 similarly to operating the operation units 12B.

(2) Configuration of Electronic Keyboard Musical Instrument

Figure 2:
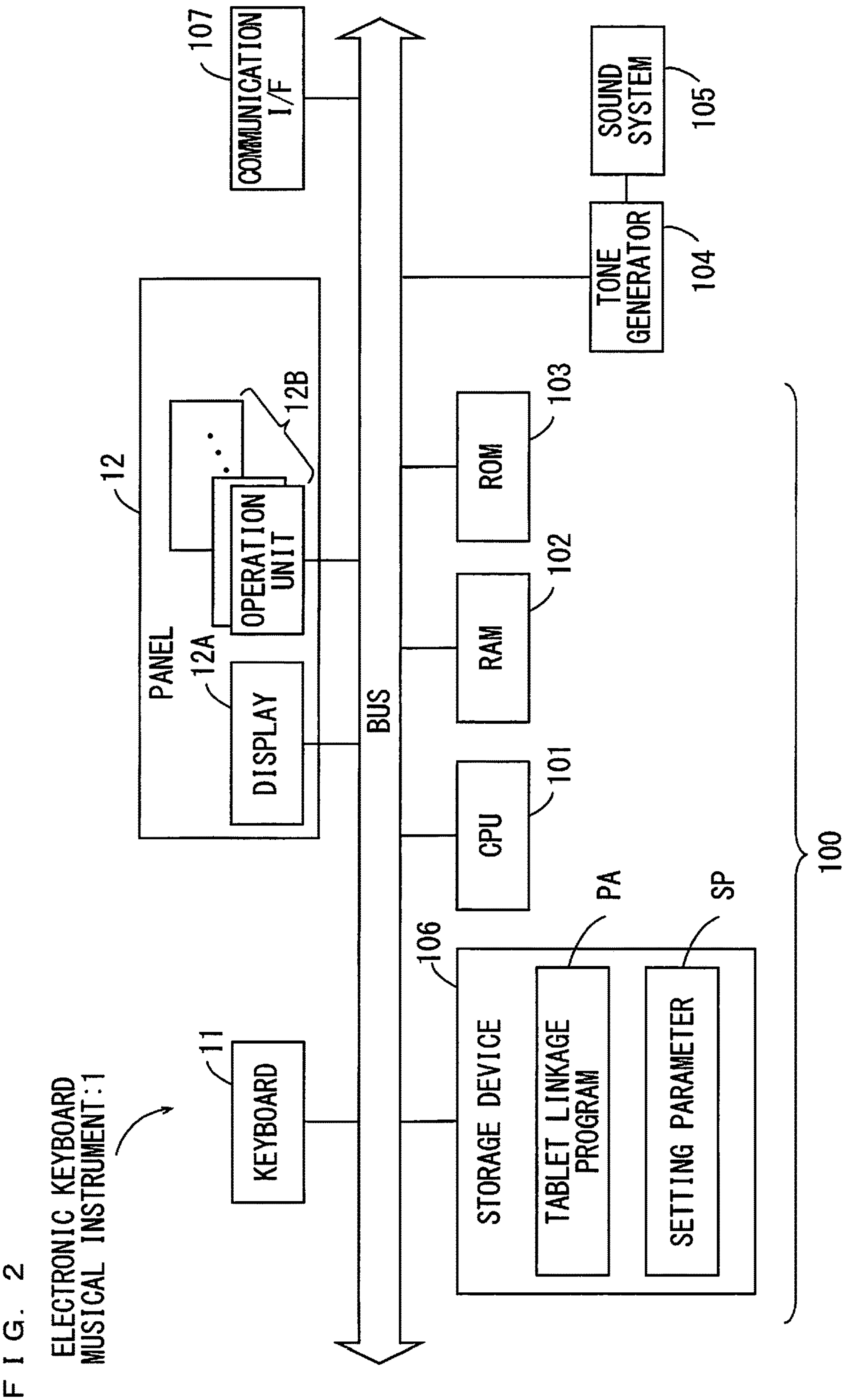
FIG. 2 is a block diagram showing the configuration of the electronic keyboard musical instrument according to the embodiment.

FIG. 2 is a block diagram showing the configuration of the electronic keyboard musical instrument 1. The electronic keyboard musical instrument 1 includes the keyboard 11, the panel 12, a CPU (Central Processing Unit) 101, a RAM (Random Access Memory) 102, a ROM (Read Only Memory) 103, a tone generator 104, a sound system 105, a storage device 106 and a communication interface 107. These devices are connected to one another via a bus.

The keyboard 11 includes a plurality of keys and receives a musical performance operation performed by the player. As described above, the panel 12 includes the display 12A and the plurality of the operation units 12B. The plurality of operation units 12B include setting buttons for a volume, a musical performance style and an accompaniment sound, for example. These setting buttons may be a mechanical button, dial, sliding bar, etc. or may be an interface utilizing a touch panel.

The CPU 101 controls the entire electronic keyboard musical instrument 1. The RAM 102 is utilized as a work area for execution of various programs by the CPU 101. The ROM 103 saves programs and data. The tone generator 104 generates a musical sound signal based on musical performance data input via the keyboard 11 or accompaniment data generated by the CPU 101. The sound system 105 converts a musical sound signal supplied from the tone generator 104 into an analogue sound signal and generates a sound based on the analogue sound signal.

The storage device 106 is a hard disc, for example. A tablet linkage program PA and a setting parameter SP are saved in the storage device 106. The tablet linkage program PA executes a process of disabling a specific operation unit 12B among the plurality of operation units 12B when confirming a connection with the tablet 5. Further, the tablet linkage program PA updates the setting parameter SP saved in the storage device 106 in accordance with the content of settings made by operating the tablet 5. The setting parameter SP is a parameter currently set with respect to the electronic keyboard musical instrument 1. The setting parameter SP is a setting value for a volume, a musical performance style or an accompaniment sound, for example.

The communication interface 107 is an interface that communicates with the tablet 5 utilizing wired or wireless communication. The communication interface 107 communicates with the tablet 5 utilizing a protocol such as a USB (Universal Serial Bus), a wireless LAN (Local Area Network), Bluetooth or infrared communication.

(3) Configuration of Tablet

Figure 3:
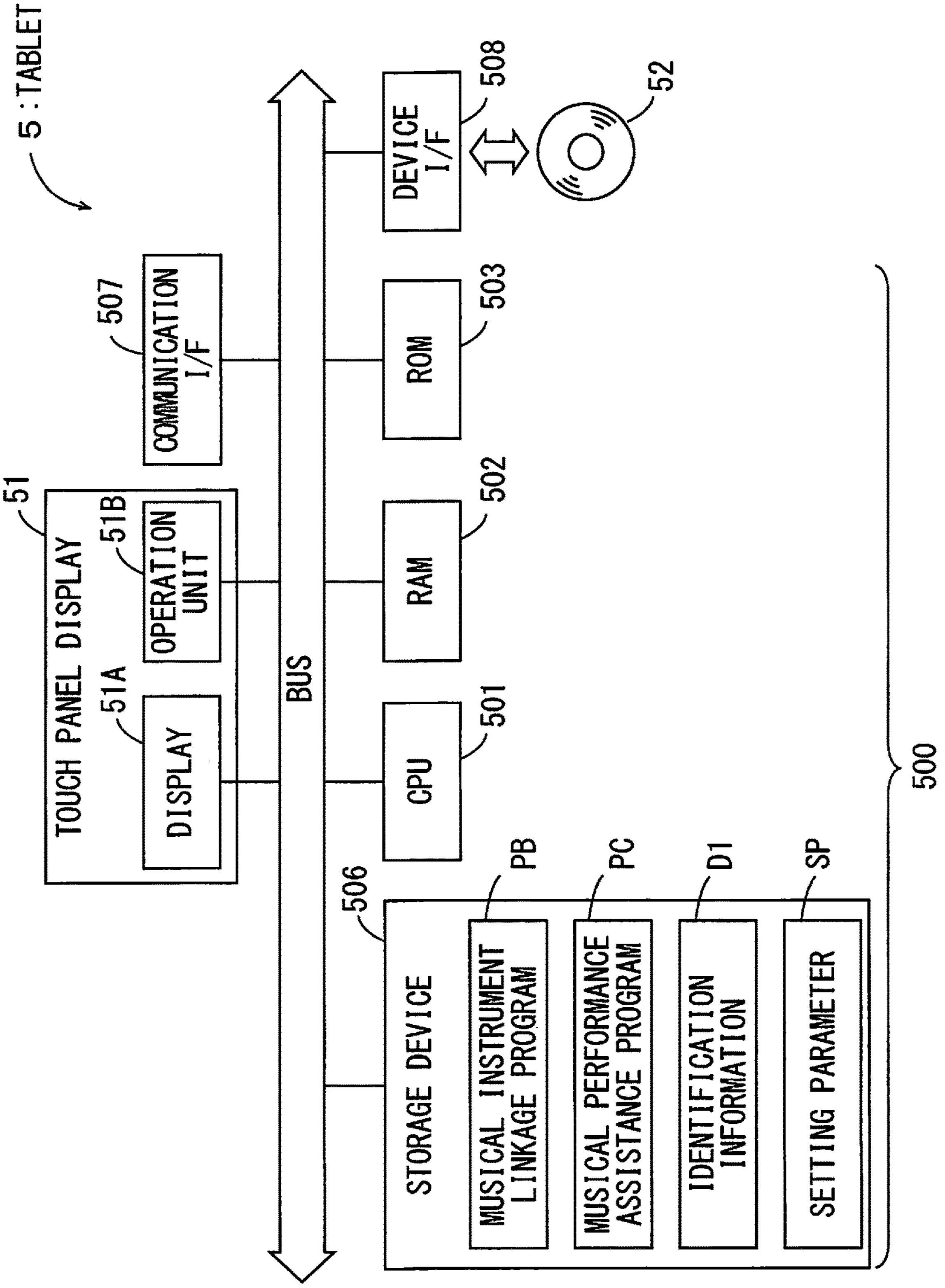
FIG. 3 is a block diagram showing the configuration of a tablet according to the embodiment.

FIG. 3 is a block diagram showing the configuration of the tablet 5. The tablet 5 includes a touch panel display 51, a CPU 501, a RAM 502, a ROM 503, a storage device 506, a communication interface 507 and a device interface 508. These devices are connected to one another via a bus.

The touch panel display 51 includes a display 51A and an operation unit 51B. The operation unit 51B is a graphical interface displayed in the touch panel display 51. The tablet 5 is connected to the electronic keyboard musical instrument 1, whereby the player can make settings of a volume, a musical performance style, an accompaniment sound, etc. with respect to the electronic keyboard musical instrument 1, for example, by operating the operation unit 51B.

The CPU 501 controls the entire tablet 5. The RAM 502 is utilized as a work area for execution of various programs by the CPU 501. The ROM 503 saves programs and data.

The storage device 506 is a hard disc, for example. In the storage device 506, a musical instrument linkage program PB, a musical performance assistance program PC, identification information D1 and a setting parameter SP are saved. When confirming a connection with the electronic keyboard musical instrument 1, the musical instrument linkage program PB executes a process of disabling a specific operation unit 12B among the plurality of operation units 12B of the electronic keyboard musical instrument 1. The musical performance assistance program PC displays various information for assisting a musical performance in addition to an electronic musical score in the display 51A of the touch panel display 51. The identification information D1 is the information for identifying the tablet 5. The setting parameter SP is a parameter that is set with respect to the electronic keyboard musical instrument 1. The setting parameter SP is a setting value for a volume, a musical performance style or an accompaniment sound, for example.

The communication interface 507 is an interface that communicates with the electronic keyboard musical instrument 1 utilizing wired or wireless communication. The communication interface 507 communicates with the electronic keyboard musical instrument 1 utilizing a protocol such as a USB (Universal Serial Bus), a wireless LAN (Local Area Network), Bluetooth or infrared communication.

(4) Functional Configuration of Electronic Keyboard Musical Instrument

Figure 4:
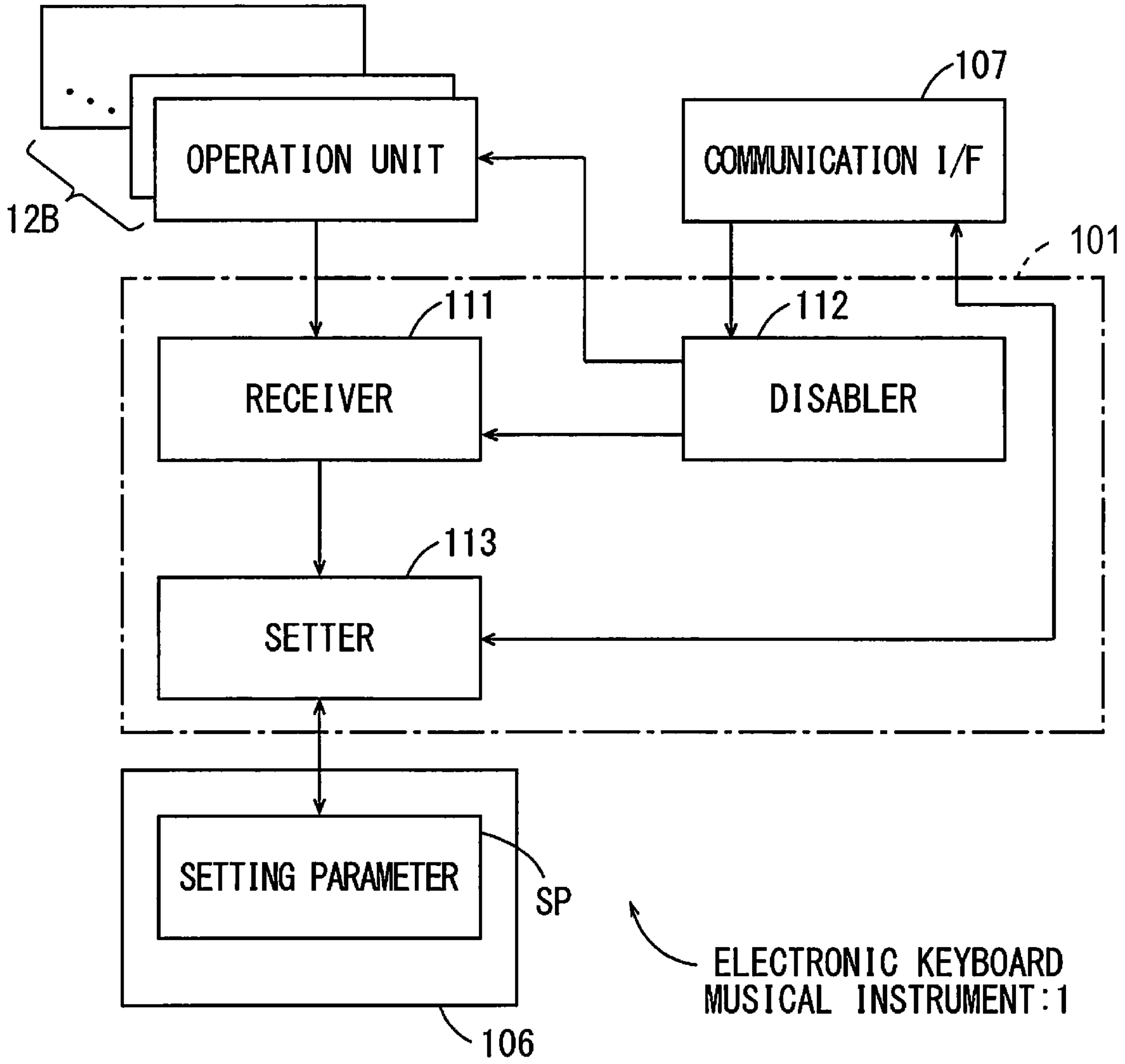
FIG. 4 is a block diagram showing the functions of the electronic keyboard musical instrument according to the embodiment.

FIG. 4 is a block diagram showing the functions of the electronic keyboard musical instrument 1. The electronic keyboard musical instrument 1 includes a controller 100. The controller 100 includes a receiver 111, a disabler 112 and a setter 113. The controller 100 is implemented when the CPU 101 executes the tablet linkage program PA while utilizing a hardware resource such as the RAM 102.

The receiver 111 receives an operation performed using the plurality of operation units 12B. The receiver 111 supplies the content of operation performed using the plurality of operation units 12B to the setter 113. The setter 113 updates the setting parameter SP in accordance with the content of operation supplied from the receiver 111. Further, when a connection is established with the tablet 5, the setter 113 transmits the setting parameter SP saved in the storage device 106 to the tablet 5 via the communication interface 107. Further, the setter 113 receives the setting parameter SP from the tablet 5 via the communication interface 107 and saves the received setting parameter SP in the storage device 106.

The disabler 112 disables a specific operation unit 12B among the plurality of operation units 12B. The disabler 112 instructs the receiver 111 to disable the specific operation unit 12B. In response, the receiver 111 does not receive an operation from the specific operation unit 12B and disables the specific operation unit 12B. Further, the disabler 112 changes a display mode of the specific operation unit 12B and clearly informs the player that the specific operation unit 12B is being disabled.

(5) Functional Configuration of Tablet

Figure 5:
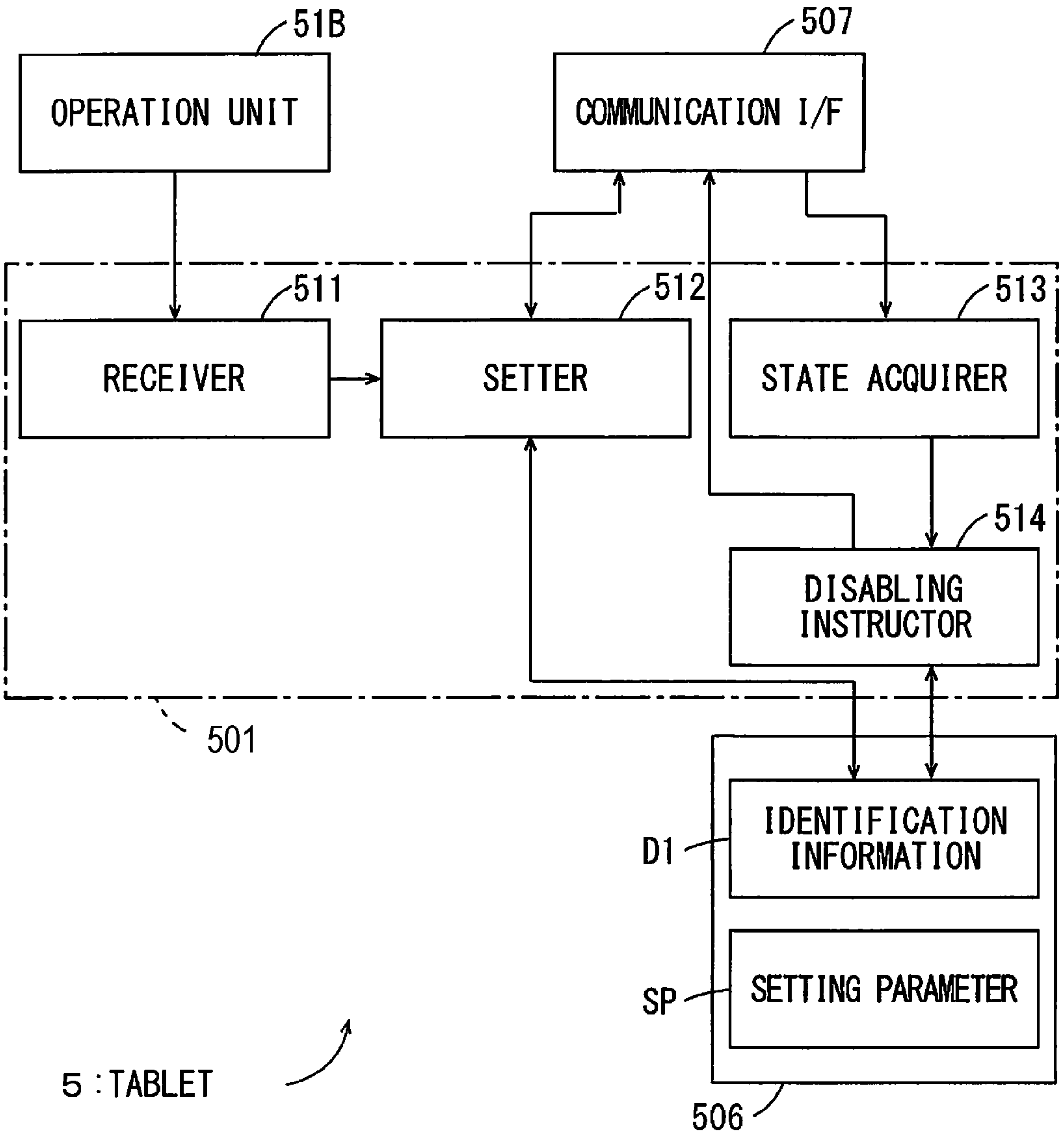
FIG. 5 is a block diagram showing the functions of the tablet according to the embodiment.

FIG. 5 is a block diagram showing the functions of the tablet 5. The tablet 5 includes a controller 500. The controller 500 includes a receiver 511, a setter 512, a state acquirer 513 and a disabling instructor 514. The controller 500 is implemented when the CPU 501 executes the musical instrument linkage program PB or the musical performance assistance program PC while utilizing a hardware resource such as the RAM 502. The receiver 511 and the setter 512 of the controller 500 are functions implemented by execution of the musical performance assistance program PC. The state acquirer 513 and the disabling instructor 514 of the controller 500 are functions implemented by execution of the musical instrument linkage program PB.

The receiver 511 receives an operation performed using the operation unit 51B. That is, the receiver 511 receives an operation performed by the player with respect to the touch panel display 51. The receiver 511 supplies the content of operation performed using the operation unit 51B to the setter 512. The setter 512 notifies the electronic keyboard musical instrument 1 of the content of operation performed using the operation unit 51B via the communication interface 507. Further, the setter 512 updates the setting parameter SP in accordance with the content of operation supplied from the receiver 511. Further, after the musical performance assistance program PC is started, the setter 512 receives the setting parameter SP from the electronic keyboard musical instrument 1 via the communication interface 507 and saves the received setting parameter SP in the storage device 506. Further, when receiving an instruction for ending the musical performance assistance program PC, the setter 512 transmits the setting parameter SP saved in the storage device 506 to the electronic keyboard musical instrument 1 via the communication interface 507.

The state acquirer 513 acquires a state representing whether communication is established with the electronic keyboard musical instrument 1. The state acquirer 513 further acquires a state representing whether the musical performance assistance program PC is started. The disabling instructor 514 transmits an instruction for disabling a specific operation unit 12B among the plurality of operation units 12B of the electronic keyboard musical instrument 1 to the electronic keyboard musical instrument 1. The disabling instructor 514 acquires identification information D1 of the tablet 5 saved in the storage device 506 and transmits the identification information D1 together with the disabling instruction to the electronic keyboard musical instrument 1.

(6) Process Flow of Musical Instrument Linkage Program

Figure 6:
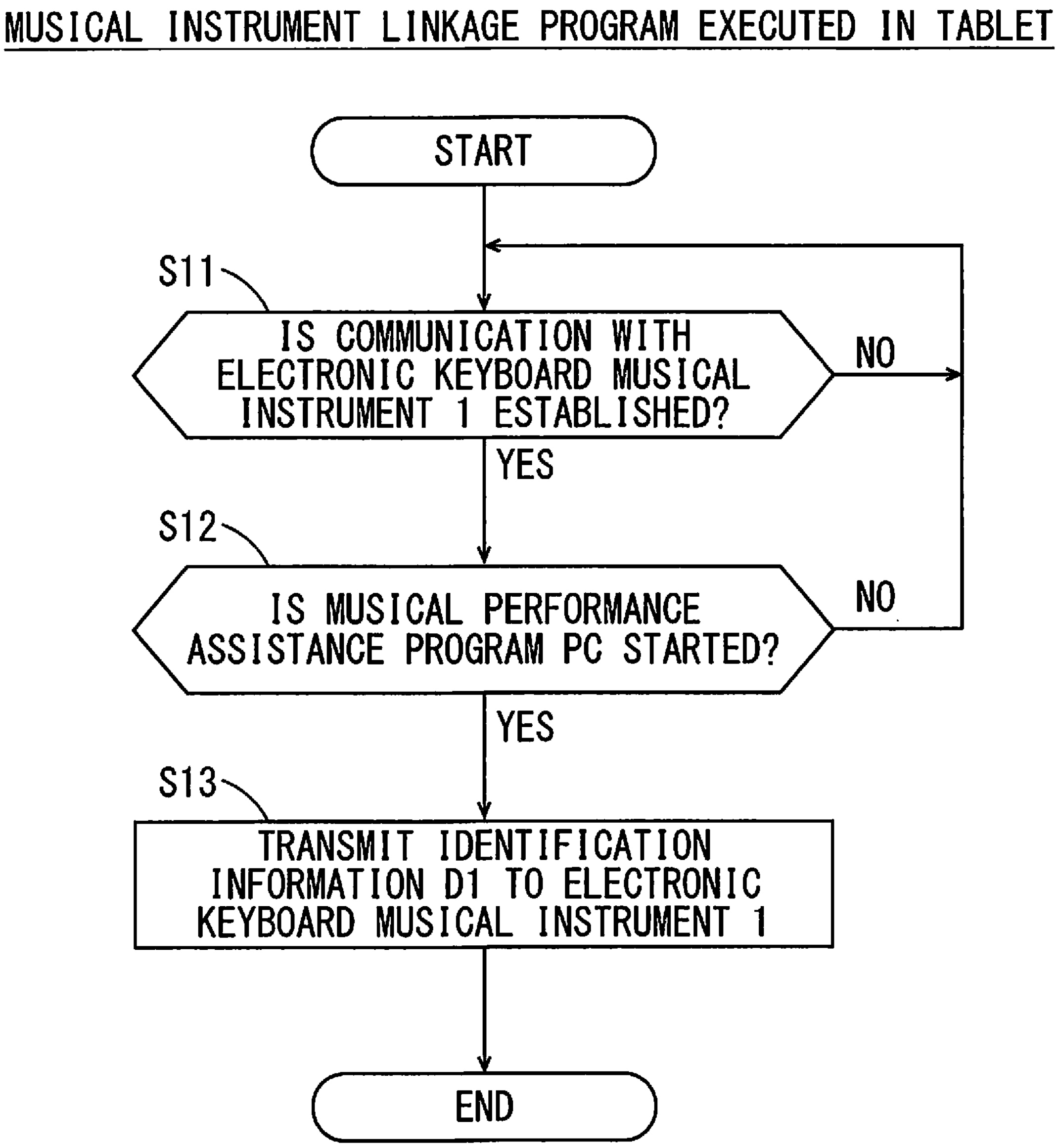
FIG. 6 is a flowchart of a musical instrument linkage program that behaves in the tablet.

Next, the process flow of the musical instrument linkage program PB that behaves in the tablet 5 will be described. FIG. 6 is a flowchart of a musical instrument linkage process to be executed by the musical instrument linkage program PB. First, the state acquirer 513 of the tablet 5 determines whether communication between the tablet 5 and the electronic keyboard musical instrument 1 is established (step S11). Next, in a case where it is determined that communication is established between the tablet 5 and the electronic keyboard musical instrument 1, the state acquirer 513 determines whether the musical performance assistance program PC is started in the tablet 5 (step S12).

In a case where it is determined that the musical performance assistance program PC is started, the disabling instructor 514 executes a process of disabling a specific operation unit 12B of the electronic keyboard musical instrument 1 (step S13). Specifically, the disabling instructor 514 acquires identification information D1 from the storage device 506. Then, the disabling instructor 514 transmits a disabling instruction together with the identification information D1 to the electronic keyboard musical instrument 1 via the communication interface 507. In a case where it is determined in the step S11 that communication between the tablet 5 and the electronic keyboard musical instrument 1 is not established, or it is determined in the step S12 that the musical performance assistance program PC is not started, the process returns to the step S11.

(7) Process Flow of Tablet Linkage Program

Figure 7:
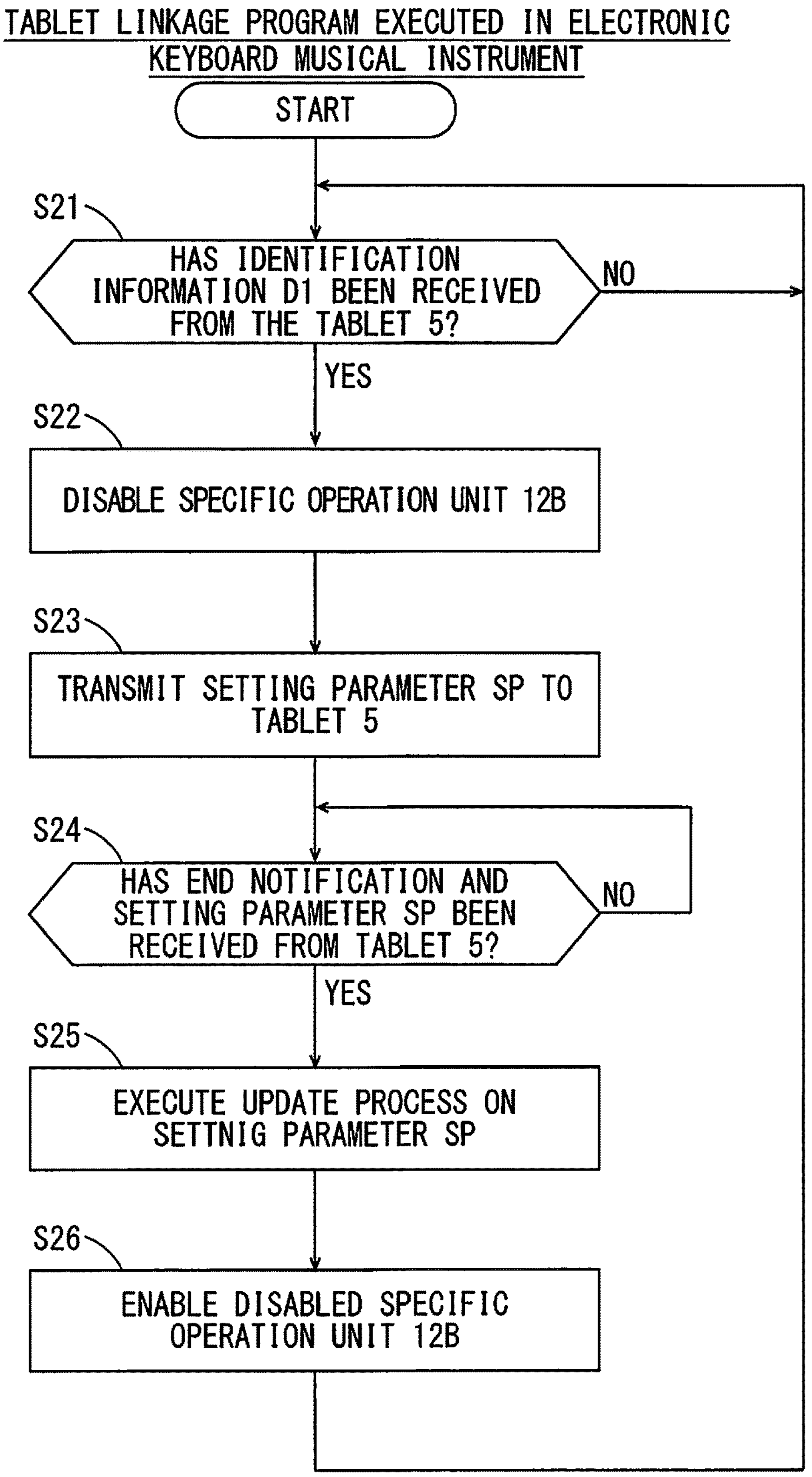
FIG. 7 is a flowchart of a tablet linkage program that behaves in the electronic keyboard musical instrument.

Next, the process flow of the tablet linkage program PA that behaves in the electronic keyboard musical instrument 1 will be described. FIG. 7 is a flowchart of a tablet linkage process executed by the tablet linkage program PA. First, the disabler 112 of the electronic keyboard musical instrument 1 determines whether the disabling instruction including the identification information D1 has been received from the tablet 5 via the communication interface 107 (step S21). That is, whether the disabling instruction transmitted in the step S13 of FIG. 6 has been received is determined. In a case where the disabling instruction including the identification information D1 has been received, the disabler 112 disables a specific operation unit 12B among the plurality of operation units 12B (step S22). Specifically, the disabler 112 instructs the receiver 111 not to receive an operation from the specific operation unit 12B. In response, the receiver 111 stops receiving an instruction from the designated specific operation unit 12B. Further, the disabler 112 provides an instruction for changing a display mode to the specific operation unit 12B. In response, the specific operation unit 12B changes the display mode and clearly informs the player that the specific operation unit 12B is being disabled. As the change of the display mode, an LED is turned off or the light of a touch panel is turned off, for example.

The information about the specific operation unit 12B that is to be disabled by the disabler 112 is saved in advance in the storage device 106, the ROM 103 or the like as setting information. All of the operation units 12B except for a power supply operation unit is set as specific operation units 12B, for example. In this case, the plurality of operation units 12B of the electronic keyboard musical instrument 1 except for the power source operation unit are disabled as the tablet 5 is connected. The disabler 112 disables at least one operation unit 12B among the plurality of operation units 12B included in the electronic keyboard musical instrument 1. The disabler 112 may disable all of the plurality of operation units 12B included in the electronic keyboard musical instrument 1.

In a case where the identification information D1 acquired from the tablet 5 is not included in registered identification information, the disabler 112 may be prevented from executing a process of disabling a specific operation unit 12B. For example, only in a case where a connection with a pre-registered tablet 5 is received, the process of disabling a specific operation unit 12B can be executed.

Next, the setter 113 of the electronic keyboard musical instrument 1 acquires a setting parameter SP saved in the storage device 106 and transmits the acquired setting parameter SP to the tablet 5 via the communication interface 107 (step S23). That is, the setting parameter SP is transmitted to the tablet 5 in order for the content of current settings in the electronic keyboard musical instrument 1 to be reflected in the tablet 5.

Next, the setter 113 of the electronic keyboard musical instrument 1 determines whether notification for ending the musical performance assistance program PC and the setting parameter SP have been received from the tablet 5 (step S24). In a case where the notification for ending the musical performance assistance program PC and the setting parameter SP have been received, the setter 113 updates the setting parameter SP saved in the storage device 106 based on the received setting parameter SP (step S25). Thus, the content of settings that have been changed in the tablet 5 is reflected in the electronic keyboard musical instrument 1. Subsequently, the setter 113 instructs the receiver 111 to enable the disabled specific operation unit 12B (step S26). Thus, the receiver 111 returns to the state of receiving an operation performed using any of the operation units 12B. Further, the setter 113 instructs the specific operation unit 12B to change the display mode back to its original mode. Thus, the LED is turned back on and the light of the touch panel is turned back on, and the player can identify that all of the operation units 12B are enabled.

(8) Process Flow of Musical Performance Assistance Program

Figure 8:
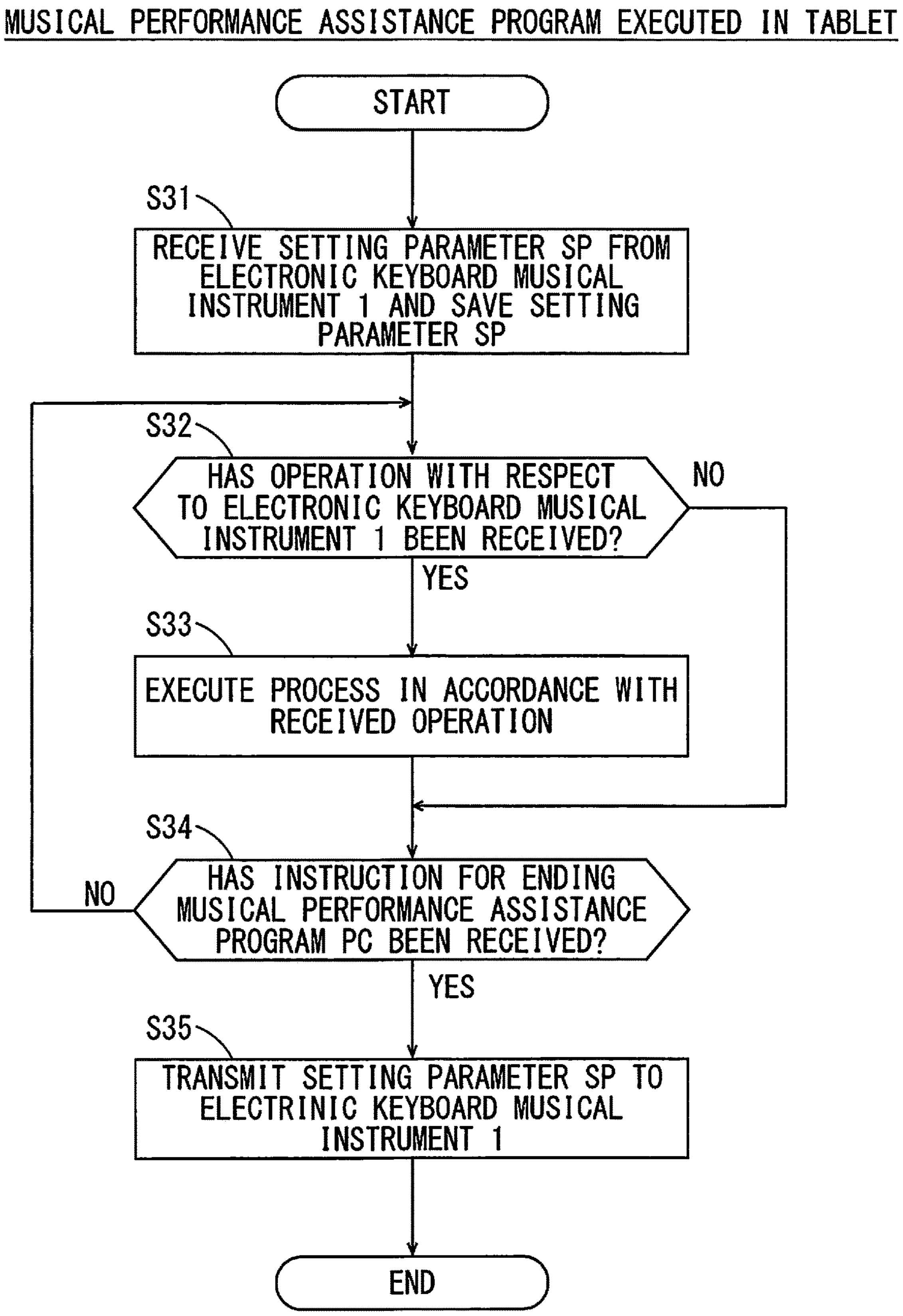
FIG. 8 is a flowchart of a musical performance assistance program that behaves in the tablet.

Next, the process flow of the musical performance assistance program PC that behaves in the tablet 5 will be described. FIG. 8 is a flowchart of a musical performance assistance process to be executed by the musical performance assistance program PC. First, the setter 512 of the tablet 5 receives a setting parameter SP from the electronic keyboard musical instrument 1 via the communication interface 507. The setter 512 saves the received setting parameter SP in the storage device 506 (step S31). That is, the setting parameter SP transmitted from the electronic keyboard musical instrument 1 in the step S23 of FIG. 7 is reflected in the tablet 5.

Next, the receiver 511 of the tablet 5 determines whether the operation unit 51B has received an operation with respect to the electronic keyboard musical instrument 1 (step S32). That is, whether a setting operation with respect to the electronic keyboard musical instrument 1 has been performed by a player who operates the touch panel display 51 is determined. In a case where the receiver 511 has received the operation with respect to the electronic keyboard musical instrument 1, the setter 512 executes a process in accordance with the received operation (step S33). For example, the setter 512 transmits an instruction in accordance with the received setting operation to the electronic keyboard musical instrument 1 via the communication interface 507. In the electronic keyboard musical instrument 1, a setting operation is performed in accordance with the instruction. For example, a musical performance mode designated in the tablet 5 is set in the electronic keyboard musical instrument 1. Further, the setter 512 updates a setting parameter SP saved in the storage device 506 in accordance with the received setting operation.

Next, the setter 512 of the tablet 5 determines whether an instruction for ending the musical performance assistance program PC has been received (step S34). In a case where the instruction for ending the musical performance assistance program PC has been received, the setter 512 transmits the setting parameter SP saved in the storage device 506 to the electronic keyboard musical instrument 1 via the communication interface 507 (step S35). In the electronic keyboard musical instrument 1, a process of updating the setting parameter SP is executed in the steps S24 and S25 shown in FIG. 7. Thus, the content of the setting parameter SP that has been updated during an operation performed using the tablet 5 is reflected in the electronic keyboard musical instrument 1. After the above-mentioned process, the musical performance assistance program PC ends.

(9) Effects of Embodiment

As described above, the electronic keyboard musical instrument 1 of the present embodiment includes the plurality of operation units 12B that receive an operation except for a musical performance operation with respect to the electronic keyboard musical instrument 1, and the disabler 112 that disables operational input in at least one operation unit among the plurality of operation units 12B when a connection with the tablet 5 for inputting an operation with respect to the electronic keyboard musical instrument 1 is established. In a case where there are a plurality of operation methods to operate a musical instrument, an interface having good operability for a player can be provided. Since not being able to operate both of the operation unit 12B of the electronic keyboard musical instrument 1 and the operation unit 51B of the tablet 5, the player can be prevented from being confused about an operation.

Further, when a connection with the tablet 5 is established, the disabler 112 may change the display mode of at least one operation unit 12B. The player can identify visually which operation unit 12B is being disabled.

Further, establishment of a connection with the tablet 5 may include establishment of communication between the tablet 5 and the electronic keyboard musical instrument 1. Because at least one operation unit 12B is disabled in response to a connection of the tablet 5 with the electronic keyboard musical instrument 1, user friendliness is good.

Further, establishment of a connection with the tablet 5 may include establishment of communication between the tablet 5 and the electronic keyboard musical instrument 1 and a start of the musical performance assistance program PC for inputting an operation to the electronic keyboard musical instrument 1 using the tablet 5. Because at least one operation unit 12B is disabled when the musical performance assistance program PC is started in the tablet 5, user friendliness is good.

The musical instrument linkage program PB according to another embodiment of the present disclosure disables operational input in at least one operation unit 12B among the plurality of operation units 12B included in the electronic keyboard musical instrument 1 when the tablet 5 confirms presence or absence of a connection with the electronic keyboard musical instrument 1 and a connection with the electronic keyboard musical instrument 1 is established by being installed in the tablet 5 that communicates with the electronic keyboard musical instrument 1. In a case where there are a plurality of operation methods to operate a musical instrument, an interface having good operability for a player can be provided.

Further, the tablet 5 may disable operational input in at least one operation unit 12B among the plurality of operation units 12B by supplying the identification information D1 of the tablet 5 to the electronic keyboard musical instrument 1 when a connection with the electronic keyboard musical instrument 1 is established. In a case where a connection with a registered tablet 5 is established, operational input in at least one operation unit 12B can be disabled.

(10) Other Embodiments

In the above-mentioned embodiment, in a case where communication with the electronic keyboard musical instrument 1 is established and the musical performance assistance program PC is started, the tablet 5 transmits an instruction for disabling a specific operation unit 12B. As another embodiment, in a case where communication with an electronic keyboard musical instrument 1 is established, a tablet 5 may transmit an instruction for disabling a specific operation unit 12B. In this case, the specific operation unit 12B is disabled at a point in time at which a player connects the tablet 5 to the electronic keyboard musical instrument 1.

In the above-mentioned embodiment, the electronic keyboard musical instrument 1 is described as an example of a musical instrument of the present disclosure. Another musical instrument such as an acoustic piano or an organ can be applied as a musical instrument of the present disclosure.

In the above-mentioned embodiment, the tablet 5 is described as a terminal device or a computer of the present disclosure, by way of example. Additionally, a laptop computer, a smartphone, etc. can be applied as the terminal device and the computer of the present disclosure.

In the above-mentioned embodiment, the musical instrument linkage program PB and the musical performance assistance program PC are saved in the storage device 506 of the tablet 5, by way of example. As another embodiment, a musical instrument linkage program PB and a musical performance assistance program PC may be supplied in the form of being stored in a storage medium 52 which is readable by a computer. A CPU 501 may execute the musical instrument linkage program PB and the musical performance assistance program PC stored in the storage medium 52 via a device interface 508. Alternatively, the CPU 501 may acquire the musical instrument linkage program PB and the musical performance assistance program PC stored in the storage medium 52 via the device interface 508 and install the musical instrument linkage program PB and the musical performance assistance program PC in the storage device 506 or the ROM 503. Further, in a case where a communication interface 507 is connected to a communication network, the musical instrument linkage program PB and the musical performance assistance program PC delivered from a server connected to the communication network may be installed in a storage device 506 or a ROM 503.

(11) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the keyboard 11 is an example of a musical performance operation unit. In the above-mentioned embodiment, the tablet 5 is an example of an electronic terminal. Further, in the above-mentioned embodiment, the tablet 5 is an example of a computer in which the musical instrument linkage program is installed.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A musical instrument communicable with an electronic terminal, the musical instrument comprising:

a musical performance operation unit including at least one first operator configured to receive a musical performance operation;

a plurality of second operators each configured to receive an operation other than the musical performance operation; and a controller, including a processor, configured to disable operational input from at least one second operator, among the plurality of second operators, upon the musical instrument establishing a communication connection with the electronic terminal to allow inputting of an operation from the electronic terminal to the musical instrument.

2. The musical instrument according to claim 1, further comprising:

a display that displays a display mode of the at least one second operator, wherein the controller changes the display mode of the at least one second operator upon establishing the communication connection with the electronic terminal.

3. The musical instrument according to claim 1, wherein establishing the communication connection with the electronic terminal starts a program for inputting the operation to the musical instrument from the electronic terminal.

4. A non-transitory computer readable medium storing a program executable by a computer to execute a method of communicating between an electronic terminal and a musical instrument including at least one first operator and a plurality of second operators, the method comprising:

receiving a musical performance operation via the at least one first operator;

receiving an operation other than the musical performance operation via the plurality of second operators;

confirming presence or absence of a communication connection between the musical instrument and the electronic terminal; and disabling operational input in at least one second operator, among the plurality of second operators, upon establishing the communication connection between the electronic terminal and the musical instrument, to allow inputting of an operation from the electronic terminal to the musical instrument.

5. The non-transitory computer readable medium according to claim 4, wherein the method further comprises supplying identification information of the computer of the musical instrument upon establishing the communication connection with the electronic terminal.

6. A musical instrument communication system comprising:

an electronic terminal including a first controller, which includes a first processor, for inputting an operation;

a musical instrument communicable with the electronic terminal, the musical instrument comprising:

a musical performance operation unit including at least one first operator that configured to receive a musical performance operation;

a plurality of second operators each configured to receive an operation other than the musical performance operation; and a second controller, including a second processor, configured to disable operational input from at least one second operator, among the plurality of second operators, upon the musical instrument establishing a communication connection with the electronic terminal, to allow inputting of an operation from the electronic terminal to the musical terminal, wherein the first controller is configured to start a program for inputting the operation to the musical instrument upon establishing the communication connection between the electronic terminal and the musical instrument.

7. The musical instrument communication system according to claim 6, wherein the electronic terminal is a tablet.

* * * * *